(12) United States Patent
Salber et al.

(10) Patent No.: US 6,182,621 B1
(45) Date of Patent: Feb. 6, 2001

(54) METHOD OF AFFECTING MIXTURE FORMATION AND CHARGE MOTION IN AN ENGINE CYLINDER

(75) Inventors: Wolfgang Salber; Thomas Esch, both of Aachen (DE)

(73) Assignee: FEV Motorentechnik GmbH & Co. KG, Aachen (DE)

(*) Notice: Under 35 U.S.C. 154(b), the term of this patent shall be extended for 0 days.

(21) Appl. No.: 09/123,578

(22) Filed: Jul. 28, 1998

(30) Foreign Application Priority Data

Jul. 31, 1997 (DE) .............................. 197 33 139

(51) Int. Cl.[7] ...................................... F02B 29/08
(52) U.S. Cl. ..................... 123/90.15; 123/90.11; 123/306; 123/346
(58) Field of Search ............... 123/90.11, 90.12, 123/90.14, 90.15, 90.16, 90.17, 90.6, 306, 345, 346

(56) References Cited

U.S. PATENT DOCUMENTS

| | | | |
|---|---|---|---|
| 2,344,993 | * | 3/1944 | Lysholm .................. 123/90.6 |
| 2,647,500 | * | 8/1953 | Lang ...................... 123/90.6 |
| 4,084,568 | * | 4/1978 | Sato et al. ................ 123/182 |
| 4,538,559 | * | 9/1985 | Imamura et al. .......... 123/90.6 |
| 4,829,947 | * | 5/1989 | Lequesne ............... 123/90.11 |
| 4,955,334 | * | 9/1990 | Kawamura .............. 123/90.11 |
| 5,669,341 | * | 9/1997 | Ushirono et al. ........ 123/90.11 |
| 5,692,463 | * | 12/1997 | Liang et al. ............. 123/90.11 |
| 5,860,399 | * | 1/1999 | Speil et al. ............. 123/90.57 |

FOREIGN PATENT DOCUMENTS

91/14858   10/1991   (WO).

* cited by examiner

*Primary Examiner*—Weilun Lo
(74) *Attorney, Agent, or Firm*—Venable; Gabor J. Kelemen

(57) ABSTRACT

A method of affecting a mixture formation and motion of a charge in a cylinder of an externally ignited internal-combustion engine during a suction cycle of a gas intake valve of the cylinder. The suction cycle has a first cycle portion and a second cycle portion; the second cycle portion constitutes an end portion (leading and/or trailing end portion) of the suction cycle. The gas intake valve has, during the first suction cycle, a first open position at full valve stroke in which the gas intake valve has a fully open cross-sectional flow passage area. The method includes the step of maintaining the gas intake valve in a second open position at a partial stroke of the gas intake valve during the second cycle portion. The partial stroke is less than one half of the full stroke, and in the second open position the gas intake valve has a partially open cross-sectional flow passage area. The method further includes the step of maintaining the gas intake valve in the first open position during the first cycle portion.

4 Claims, 3 Drawing Sheets

METHOD OF AFFECTING MIXTURE FORMATION AND CHARGE MOTION IN AN ENGINE CYLINDER

CROSS REFERENCE TO RELATED APPLICATION

This application claims the priority of German Application No. 197 33 139.4 filed Jul. 31, 1997, which is incorporated herein by reference.

BACKGROUND OF THE INVENTION

For influencing the formation of mixture and the motion of a charge in cylinders of externally ignited piston-type internal-combustion engines, published International Application WO 91/14858 describes means in the region of the intake valves for a controllable flow deflection as the intake gas passes from the intake opening into the cylinder. An insufficient mixture formation is caused by an insufficient or missing vacuum in the intake pipe due to a poor fuel vaporization and cannot be improved at a fully open cross-sectional flow passage area of the valve because of the low intake velocity. Slides, gates, pivotal nozzles and the like are proposed as means for deflecting the flow. Such elements are arranged in the channel-like intake port immediately in the region of the intake opening and are operated by suitable setting means as a function of the operational condition of the engine. The setting means are actuated by a control device to so deflect the inflowing air/fuel mixture (hereafter designated as gas flow) under certain operational conditions that during the suction stroke within the cylinder chamber a turbulence (vortex) is generated whose rotary axis extends essentially transversely to the cylinder axis. It is a disadvantage of such an arrangement that the flow deflecting elements are disposed and supported in the intake port immediately upstream of the intake opening, that is, in a region in which only little room is available for additional structural components.

SUMMARY OF THE INVENTION

It is an object of the invention to provide an improved method of the above-outlined type which affects the mixture formation and the charge motion in engine cylinders without the need of encumbering structural components.

This object and others to become apparent as the specification progresses, are accomplished by the invention, according to which, briefly stated, the method of affecting a mixture formation and motion of a charge in a cylinder of an externally ignited internal-combustion engine during a suction cycle of a gas intake valve of the cylinder is performed such that during a beginning (leading) and/or terminal (trailing) portion of the suction cycle the valve is opened and maintained open only partially at a valve stroke which is less than one half of its full stroke and for the remainder of the suction cycle the gas intake valve is fully open at a full valve stroke.

By changing the cross-sectional area of the valve flow passage as outlined above, the mixture preparation and charge motion may be advantageously affected. By initially providing only a small cross-sectional flow passage area, the mixture preparation is improved and subsequently, by opening the valve to the full cross-sectional flow passage area, the combustion chamber is filled with the fresh mixture. In the first phase of the piston stroke the fuel/air mixture flows into the combustion chamber at a high velocity through the only slightly opened cylinder valve, positively supporting the mixture preparation and mixture homogenization. The charge quantity required for obtaining a desired load point may, however, not be obtained with a constantly small cross-sectional area of the flow passage so that during the same opening phase (suction cycle) the cylinder valve is fully opened by a suitable control system to thus ensure an optimal filling of the combustion chamber with a fresh mixture.

The method according to the invention may be performed in several ways. Thus, according to a preferred embodiment of the invention, in the beginning the open period of the gas intake valve during a full "closed-open-closed" suction cycle, the valve is maintained only partially open and only for a short period, at the end of which the valve is closed and shortly thereafter re-opened to the full flow passage area. In this manner with a first, partial mixture charge a motion is initiated in the cylinder chamber at an increasing vacuum, so that subsequently, at full valve opening, the full charge quantity may flow in with high speed by virtue of the increased vacuum.

According to another preferred embodiment of the method of the invention, the gas intake valve is first opened to the full cross section, thereafter maintained at a partially open state and then fully closed. With such a method too, it is possible to introduce a residual quantity of fresh gas at high velocity into the cylinder towards the end of the suction cycle and to thus favorably affect the charge motion in the cylinder. As a variant, the valve may be fully closed after the initial full opening and thereafter opened and maintained briefly in a partially open state.

The above-outlined different modes of operation may be combined with one another dependent upon the load conditions, and it is also feasible to control, in engines having a plurality of gas intake valves for each cylinder, all or only a single valve of the cylinder with the method according to the invention.

While it is in principle feasible to obtain the inventive suction cycle characteristics of the cylinder valve by mechanical drives, the method according to the invention finds particularly advantageous application in piston-type internal-combustion engines whose cylinder valves are operated by electromagnetic actuators in which the control periods are freely variable. Thus, by different opening and closing moments for the individual suction cycle stages (partially open or fully open cross-sectional flow passage area), different open periods for the suction cycle stages can be obtained.

DESCRIPTION OF THE PREFERRED EMBODIMENTS

Figure 1:
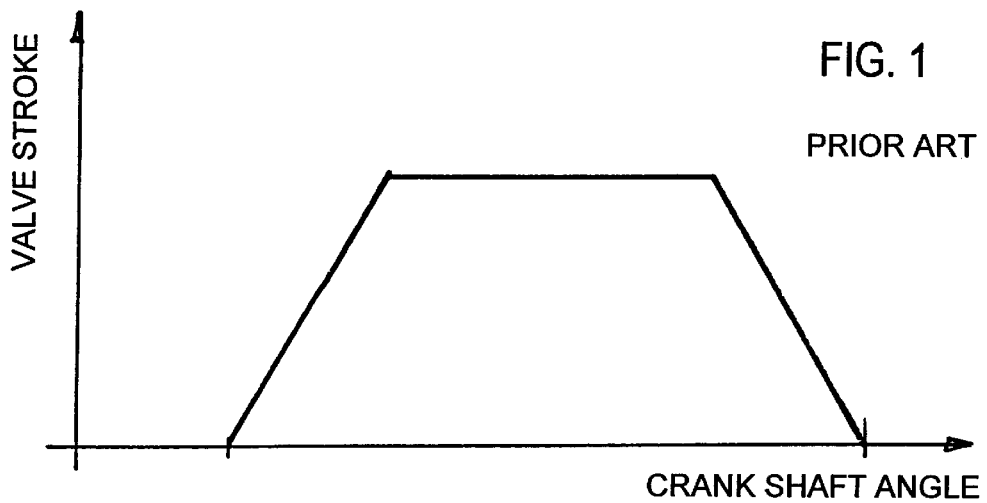
FIG. 1 is a graph illustrating the stroke S of a gas intake valve as a function of the crankshaft angle according to a conventional valve control method.

In the course of a conventional control of a suction cycle of an intake valve as illustrated in FIG. 1, the valve is moved directly into and maintained in a full-stroke position for a given period so that the gas may flow into the combustion chamber through a fully open cross-sectional area of the valve flow passage. Thereafter, the gas intake valve is fully closed. A valve opening characteristic of this type, particularly at partial load conditions, does not yield a fully satisfactory mixture preparation in Otto engines.

Figure 2:
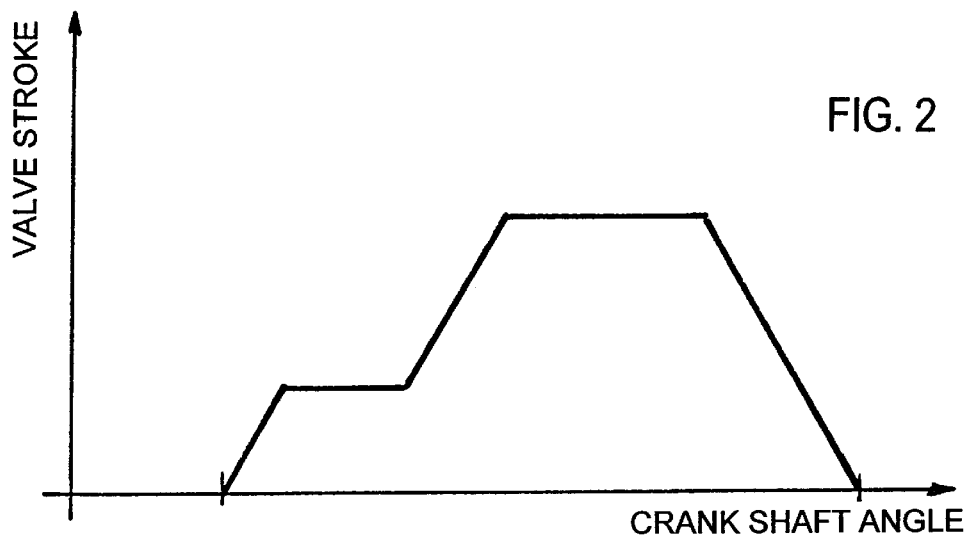
FIGS. 2, 3, 4, 5 and 6 are graphs illustrating the stroke S of a gas intake valve as a function of the crankshaft angle according to five preferred embodiments of the valve control method according to the invention.

If, as shown in FIG. 2, during a leading end portion of the suction cycle, the valve is opened only with a short stroke and is maintained in such a partially open position, then, corresponding to the predetermined vacuum, the gas may flow through the small cross-sectional flow passage area with high speed into the combustion chamber so that subsequently, upon a full opening of the valve, the combustion chamber receives the full charge fill and the vortex induced at the beginning of the suction cycle improves the mixture preparation and the motion of the charge. Such partial opening (partial stroke) of the valve is, according to the invention, less than one half of the full stroke of the valve.

Figure 3:
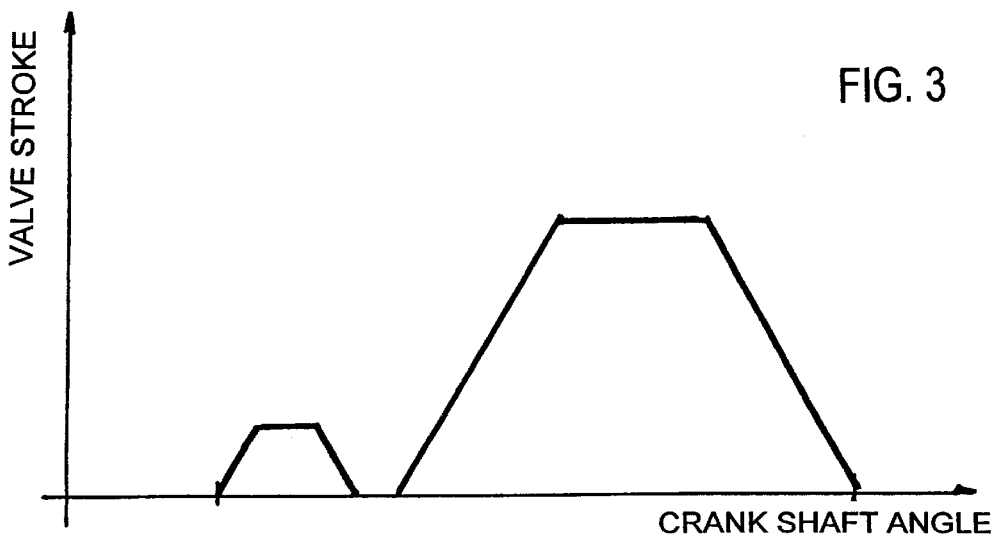

The same effect may be achieved if, as shown in FIG. 3, the valve is opened during the short-period leading end portion of the suction cycle with a small stroke, then the valve is closed and after a delay it is again opened with a full stroke to the fully open cross-sectional flow passage area. Since the piston, during the short closed period of the valve, continues to move, during such period the vacuum in the combustion chamber increases so that the residual gas may flow into the combustion chamber with a correspondingly increased velocity.

Figure 4:
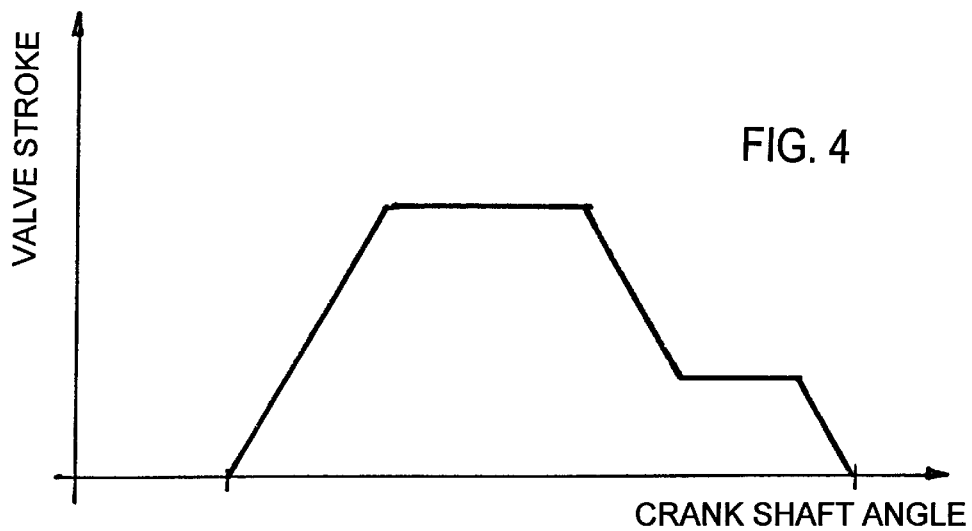
Figure 5:
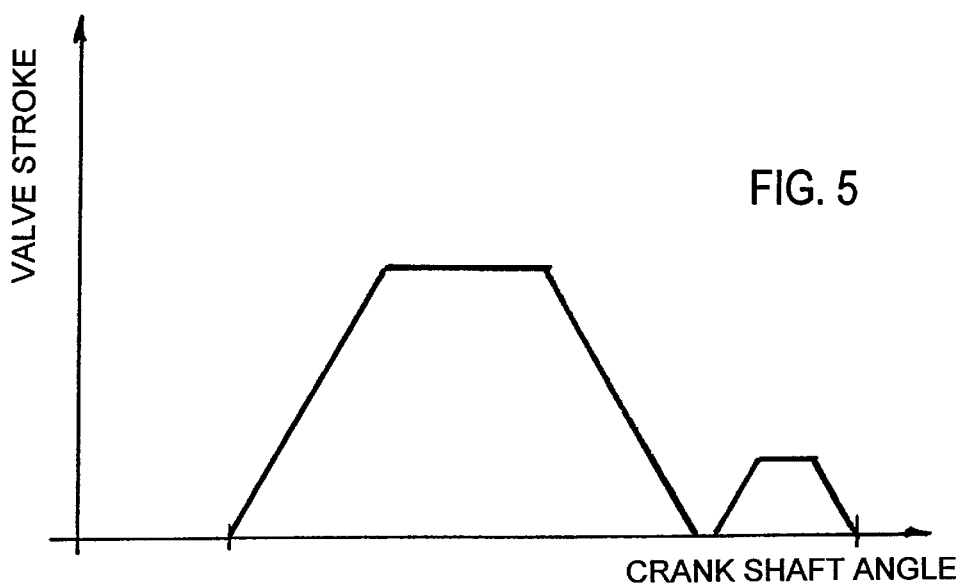

The stroke curves according to FIGS. 4 and 5 represent respective reversals of the cycle courses described in FIGS. 2 and 3; as a result, during the trailing end portion of the suction cycle the inflowing gas again may flow into the combustion chamber with a high velocity.

Figure 6:
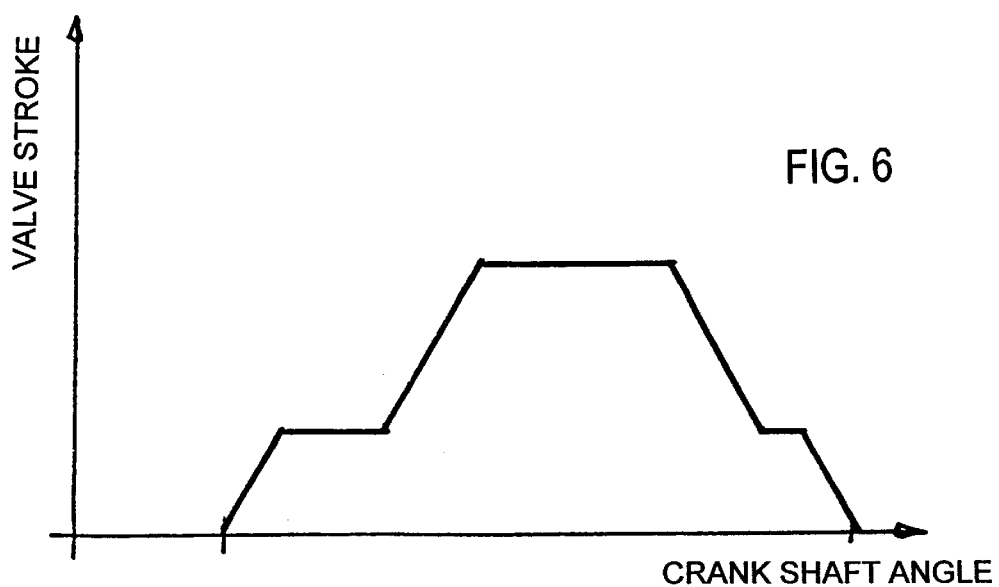

FIG. 6 shows a suction cycle curve which essentially is a superposition of the curves shown in FIGS. 2 and 4. Thus, during a leading end portion and a trailing end portion of the suction cycle, the intake valve is maintained open for a short period of time at a partially open cross-sectional area of the flow passage.

Figure 7:
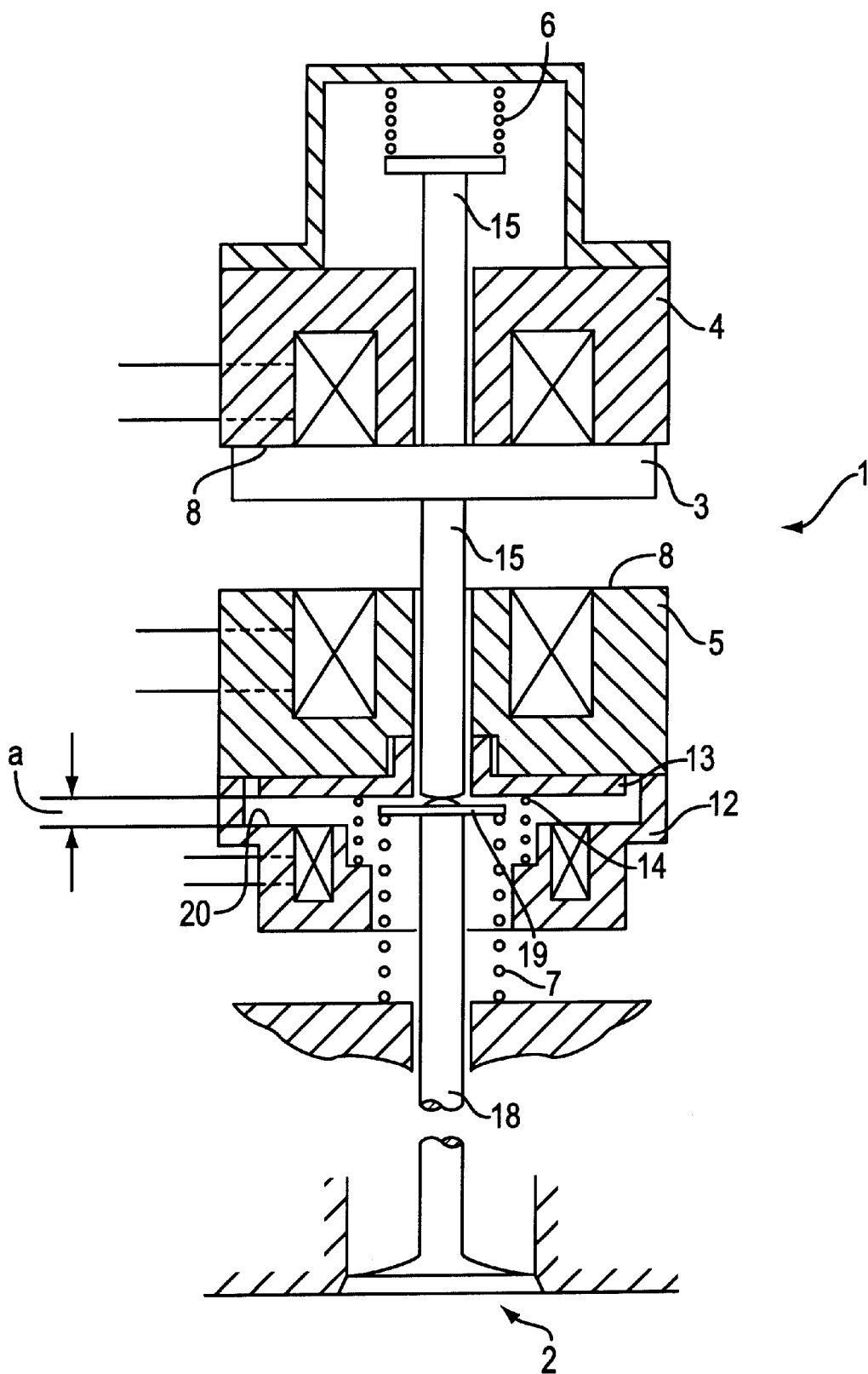
FIG. 7 is a schematic axial sectional view of an example of an electromagnetic actuator for performing the method according to the invention.

FIG. 7 illustrates an electromagnetic actuator 1 operatively coupled with a cylinder valve 2. The electromagnetic actuator has an armature 3 associated with a closing magnet 4 and an opening magnet 5. Both magnets are connected with a non-illustrated electronic control device so that upon alternating controlled energization of the two electromagnets the armature 3 may move back and forth between the two electromagnets 4 and 5 against the resetting force of an opening spring 6 and an oppositely acting closing spring 7. The armature 3 assumes its respective setting position by lying on the pole face 8 of the respective electromagnet 4 or 5. In the shown example, the two resetting springs 6 and 7 are of identical design so that in the de-energized state of the electromagnets 4 and 5 the position of rest of the armature 3 is half way between the pole faces 8 of the two electromagnets 4 and 5.

If, as shown in FIG. 7, the closing magnet 4 is in an energized state, the armature 3 lies against the pole face 8 of the closing magnet 4 and retains the intake valve 2 in its closed position. If the current to the closing magnet 4 is switched off, then the force of the opening spring 6 moves the armature, together with the gas intake valve 2 in the direction of the opening magnet 5 against the increasing force of the closing spring 7. Upon energizing the opening magnet 5 at a predetermined controllable moment as the armature 3 passes the position of rest, a corresponding magnetic field builds up which captures the armature 3 and moves the same into a contacting position with the pole face 8 of the opening magnet 5 against the increasing force of the closing spring 7. After an open period determined by the control device, the opening magnet 5 is de-energized and thereafter the closing magnet 4 is energized, causing the armature 3 again to move into the closed position as shown in FIG. 7 and thus the gas intake opening is closed. Such a stroke course (suction cycle) corresponds to that described in connection with FIG. 1.

In the illustrated embodiment, the resetting spring 7 acts on a spring seat disk 19 connected with a valve stem 18 of the gas intake valve 2. The valve stem 18 and the guide rod 15 of the armature 3 are of separate (divided) construction.

An additional opening magnet 12 which is associated with the opening magnet 5 has an armature 13 arranged on that side of the magnet which is oriented away from the pole face 8. The armature 13 may be guided, for example, in the yoke of the opening magnet 5. The armature 13 is maintained in its position of rest by a holding spring 14. The distance of the armature 13 from the pole face 20 of the additional-opening magnet 12 determines the extent of a reduced opening stroke such as described in connection with FIGS. 2–6.

As, in an uninterrupted energized state of the closing magnet 4, the cylinder valve 2 is held in the closed position by the resetting spring 7, the additional magnet 12 may be energized which causes motion of the armature 13 and thus the intake valve 2 which is opened only to an extent which corresponds to the predetermined distance a extending from the armature 13 (when in engagement with the closing magnet 4) to the pole face 20. Such an open state of the valve 2 lasts for the duration of the energization of the additional magnet 12. If the additional magnet 12 is de-energized, the gas intake valve 2 is again closed by means of the resetting spring 7. If subsequently the closing magnet 4 is de-energized to achieve a full opening the valve 2, the suction cycle illustrated in FIG. 3 is obtained.

The additional magnet 12 may be controlled such that first, as described earlier, the gas intake valve 2 is opened and maintained open with a small stroke. If subsequently the closing magnet 4 is de-energized and the opening magnet 5 is accordingly energized, the suction cycle curve according to FIG. 2 is obtained.

The suction cycle curves shown in FIGS. 4, 5 and 6 too, may be obtained by a suitably timed energization and de-energization of the electromagnets 4, 5 and 12.

The open periods for the partial stroke as well as for the full stroke and the relationship of these open periods to one another may be predetermined by a corresponding design of the engine control for the respective load conditions.

The method according to the invention is not limited to gas intake valves operated by an electromagnetic actuator. In principle, the suction cycle curves according to the invention may be obtained by any type of actuator structure which make possible a stepped stroke motion of the gas intake valve. It is particularly advantageous to use actuators which may be freely controlled as it is the case in electromagnetic actuators.

It will be understood that the above description of the present invention is susceptible to various modifications, changes and adaptations, and the same are intended to be comprehended within the meaning and range of equivalents of the appended claims.

What is claimed is:

1. A method of affecting a mixture formation and motion of a charge in a cylinder of an externally ignited internal-combustion engine during a suction cycle of a gas intake valve of the cylinder; said suction cycle having a first cycle portion and a subsequent, second cycle portion; the method comprising the following steps:

(a) introducing air and fuel into the cylinder during said suction cycle;

(b) maintaining, during said second cycle portion, said gas intake valve in a first open position at full valve stroke in which said gas intake valve has a fully open cross-sectional flow passage area; and (c) maintaining, during said first cycle portion, said gas intake valve in a second open position at a partial stroke of said gas intake valve; said partial stroke being less than one half of said full stroke; and in said second open position said gas intake valve having a partially open cross-sectional flow passage area.

2. The method as defined in claim 1, wherein said step (b) comprises the step of directly moving said gas intake valve into said first open position from said second open position.

3. The method as defined in claim 1, further comprising the step of fully closing said gas intake valve upon ending step (c) and before starting step (b).

4. The method as defined in claim 3, further comprising the step of maintaining said gas intake valve closed for a period between steps (c) and (b).

* * * * *